Patented July 5, 1932

1,866,409

UNITED STATES PATENT OFFICE

THOMAS DANIEL KELLY, OF LONDON, ENGLAND

TREATING FERMENTED MATERIALS

No Drawing. Application filed August 15, 1927, Serial No. 213,212, and in Great Britain July 29, 1927.

This invention has for its object the treatment of fermented material, such as ethyl alcohol, in such a manner that it is not easily acidified and can be solidified and can thus be used in enhancing the value of medicinal and food products (in the latter case taking the place of preservatives like boric or benzoic acids, or the salicylates).

According to this invention ethyl alcohol is mixed with a small proportion (under 10%) of glycerol and, in order to counteract any tendency of said mixture to acidify, a small proportion (from .5% to 5%) of an alkaline material, such as calcium phosphate, soluble in the liquid and not deleterious to the human system is added. It is then mixed with under 5% of coagulating material, for example, agar-agar or farina, which permeates the whole mass, which is then heated to a temperature of 50° to 80° C. and then suddenly cooled, for instance by placing it in brine-surrounded receptacles, or by placing it in a refrigerator or cold storage. The resulting solid may be cut up into any shapes desired, or ground to powder. It is then ready for mixing with medicinal or food products. It should be packed in waterproof, heatproof and greaseproof containers.

What I claim and desire to secure by Letters Patent is:—

1. A process for solidifying ethyl alcohol to render same suitable for use as a preservative of medicinal or food products, comprising adding to the alcohol a small proportion of glycerol, and a small proportion of calcium phosphate to check any tendency of the material to acidify, solidifying said mixture by adding thereto a material capable of reducing it to a jelly-like form, raising the temperature of the mixture to between 50 and 80° C., and then cooling the mixture.

2. A process according to claim 1 wherein the jelly-forming material added to the mixture of alcohol and alkaline material is farina.

3. A process according to claim 1 wherein the jelly-forming material added to the mixture is agar-agar.

In testimony whereof I have hereunto set my hand.

THOMAS DANIEL KELLY.